(12) United States Patent
Macrae

(10) Patent No.: US 8,737,516 B2
(45) Date of Patent: May 27, 2014

(54) AMPLITUDE MODULATION OF CARRIER TO ENCODE DATA

(76) Inventor: Nigel Iain Stuart Macrae, Las Vegas, NV (US)

( * ) Notice: Subject to any disclaimer, the term of this patent is extended or adjusted under 35 U.S.C. 154(b) by 350 days.

(21) Appl. No.: 13/239,239

(22) Filed: Sep. 21, 2011

(65) Prior Publication Data

US 2013/0070872 A1 Mar. 21, 2013

(51) Int. Cl.
*H03C 5/00* (2006.01)
*H03D 5/00* (2006.01)
*H03K 7/10* (2006.01)
*H03K 9/10* (2006.01)

(52) U.S. Cl.
USPC .......... 375/269; 375/268; 375/300; 375/308; 375/329; 332/103; 332/104; 332/149; 329/304; 329/306; 329/305

(58) Field of Classification Search
USPC .......... 375/269, 268, 300, 308, 328; 332/103, 332/104, 149; 329/304, 306, 305
See application file for complete search history.

(56) References Cited

U.S. PATENT DOCUMENTS

| | | | |
|---|---|---|---|
| 3,845,412 A | 10/1974 | Rearwin | |
| 3,849,595 A | 11/1974 | Ishiguro | |
| 4,731,798 A | 3/1988 | Dirr | |
| 5,321,799 A | 6/1994 | McCune | |
| 5,675,609 A | 10/1997 | Johnson | |
| 6,421,393 B1 * | 7/2002 | Thornton | 375/259 |
| 6,462,679 B1 | 10/2002 | Van Nguyen | |
| 6,574,284 B1 | 6/2003 | Jordan | |
| 6,621,426 B1 | 9/2003 | Van Nguyen | |
| 7,046,741 B2 | 5/2006 | Brown | |
| 2008/0260165 A1 * | 10/2008 | Saito et al. | 381/3 |

* cited by examiner

*Primary Examiner* — Phuong Phu (57) ABSTRACT

A method and system is provided for communicating distinct data over a single frequency using on-off keying, a form of amplitude modulation, or phase changes timed to the zero crossing point of the carrier. A data signal is synchronized with the carrier by adding padding bits so that the number of bits is equal to the frequency of the carrier. The carrier is then modified by attenuating the carrier as needed once per cycle. Said carrier is then transmitted. The resulting transmitted carrier carries a number of bits equal to the transmit frequency. At the receive end, the received signal is compared to a sine wave to determine if the incoming signal is at full strength or at reduced strength, allowing for the detection of encoded digital information. In a another embodiment, the phase of the carrier is changed instead of attenuating the carrier, timed to the carrier cycles, once or twice per cycle.

11 Claims, 6 Drawing Sheets

Fig 5 side band   center   side band

Frequency →

Power

500

510   Center Carrier (carrier combined with data)

FIG 6

AMPLITUDE MODULATION OF CARRIER TO ENCODE DATA

FIELD OF INVENTION

The method and system disclosed herein, in general, relates to information communication. More particularly, the method and system disclosed herein relates to communicating distinct data over a single radio frequency, called a carrier, using amplitude modulation (AM). In this disclosure a carrier is modified using amplitude changes timed to the cycles of the transmitted carrier. Said single radio frequency carrier is attenuated or not depending on the binary state of the digital information to be carried. The attenuation is synchronized to the carrier phase so that preferably one bit of information is carried for each cycle of the carrier with the attenuator switching timed to the zero crossing points of the carrier. Preferably a one bit is represented by the full strength of the transmit carrier and a zero bit is represented by a heavily attenuated carrier. The data rate is equal to the frequency of the transmitted carrier. All harmonics are filtered off. Just the carrier is transmitted with attenuated and unattenuated portions indicating bits. The occupied bandwidth is minimal.

In the alternative embodiment, a 180 degree phase change is performed once per cycle as the transmit carrier passes the zero point.

BACKGROUND OF THE INVENTION

Typically when encoding information a modulation scheme is super imposed on a radio frequency carrier. The carrier is a sine wave. In amplitude modulation the information to be transmitted is used to strengthen or weaken the carrier to indicate the value of the information. Typically, in AM radio the information to be transmitted is not synchronized to the carrier frequency but is only used to modulate the carrier. For example in commercial AM radio analog information is used to directly modulate the transmit carrier, where the information to be transmitted is directly proportional to the power level of the transmitted signal. Due to the generation of beat frequencies, using the information signal to modulate the carrier results in three signals: the carrier, the carrier plus the modulating signal and the carrier minus the modulating signal. AM typically produces a center carrier with little information and two thirds of the power and two side bands on each side of the carrier that contain the encoded information but only one third of the power. For example, in traditional AM radio broadcasting, a 10 kHz signal is carried on a carrier between 600 kHz to 1700 kHz and occupies 20 kHz of bandwidth. The occupied bandwidth is twice the bandwidth of the information signal, or two times the band width of the audio signal. The data or information is not synchronized to the carrier phase angle or cycles. The advantage of the following disclosure is that it uses a very narrow bandwidth to carry very high rates of data. The bandwidth is not correlated to the data rate. The data rate equals the transmit frequency.

In the simplest form of AM communications a sine wave carrier signal is turned on and off to represent information. This is the system used to transmit Morse code. A carrier is keyed on and off to represent data in the form of long bits and short bits. The frequency of on off keying is usually much less than the frequency of the carrier, and the keying is not synchronized to the cycles of the carrier. The present invention switches the carrier on and off with the changes synchronous to the frequency of the carrier.

Other versions of AM just use one or both of the side bands while suppressing the main carrier. AM single side band is more bandwidth efficient since it only uses one of the sidebands, but is very prone to noise.

Cable TV systems along with others use QAM encoding. This is a combination of AM and FM modulation schemes. It uses two carriers that are 90 degrees out of phase with each other. Each of these two channels is phase and amplitude adjusted independently to represent information. The data is synchronized to these two lower frequency channels and 8, 16, 64, and 256 bps are typical encoding rates. After encoding the two channels, they are combined and then mixed with a high frequency sine wave to form the final transmit signal. The data is not synchronized to the phase angle of the transmit carrier, but is synchronized to the two internal 90 degrees out of phase intermediate frequency carriers of the QAM modulator which are significantly lower in frequency than the frequency of the transmit carrier. The bandwidth of the transmission is the symbol rate divided by the encoding rate.

In Frequency Modulation the information is encoded onto a lower frequency carrier called an intermediate frequency which is then mixed with a higher frequency signal to result in a transmit frequency signal. The transmit carrier is usually at a much higher frequency than the rate of the information to be carried and the carrier is not synchronized with the transmitted information. The band width is two times the information signal bandwidth.

Phase shift keying uses phase shifts in a sine wave signal to transmit binary states. Phase shifts can occur twice per cycle (BPSK) up to many times per cycle. Usually an intermediate frequency carrier is encoded with phase shifts and then combined with a high frequency carrier to result in a transmit frequency carrier.

None of the above systems synchronize the digital data to the frequency of the transmit carrier.

Van Nguyen in U.S. Pat. Nos. 6,462,679 B1 and 6,621,426 B1 suggested changing the amplitude of the carrier wave synchronously with the transmit carrier phase by selecting from one of several sine wave generators of different amplitudes, each level indicating a binary state. In U.S. Pat. No. 6,621,426 B1 he suggested switching between sine wave generators every half cycle and in U.S. Pat. No. 6,462,679 B1 he suggested switching between sine wave generators every ¼ cycle.

A problem occurs in the Van Nguyen patent when amplifying multiple carriers in a common amplifier as the carriers interact with each other. The full power signal of one sine wave will draw power from all other carriers reducing the amplitude of the other carriers, resulting in false zeros. Intermodulation occurs between the various carriers as each of the carriers change binary state. This results in false readings in said carriers, particularly as the bits per cycle increases or the number of carriers increases. The current invention avoids this by reducing the amplitude to near zero for one of the binary states with full power for the other sate. It can be looked at as on off signaling timed to the carrier phase. The presence of a carrier indicates a one and a near zero voltage carrier indicates a zero. Intermodulation will not effect the detection of the bit state of the carrier. Secondly, the Van Nguyen process of selecting from multiple carriers will result in noise at the switching between sine waves. Thirdly, the system proposed herein is much simpler to implement since it just requires the switching of a transistor on and off synchonized to the carrier. Fourthly, the current invention suggests only changing states once per carrier cycle rather than two to four times as suggested by Van Nguyen.

Mark Jorden in U.S. Pat. No. 6,574,284 B1 suggested changing the amplitude of a carrier on a microcontroller bus signal to represent two binary states by selecting between two sine wave signals. He suggested changing the amplitude twice per cycle. The resulting waveform looks like a carrier with increased and decreased amplitudes synchronized to each half cycle. He did not propose switching the carrier on and off. The problem of inter-carrier modulation is not addressed since the disclosure is for transmission along wires of a single data signal.

In order to avoid the consequence of other carriers in the same amplifier affecting the amplitude of the first carrier and to simplify the method of encoding, this disclosure is presented.

The advantages of transmitting one bit per one cycle of transmitted information are 1) a high data rate, and 2) narrow bandwidth, that is, any sideband signals are so far away from the main carrier that they are easily filtered off and all of the information is carried in the center frequency. The lower side band is actually at zero hertz. The bandwidth required is only that necessary to detect a sine wave carrier.

In the following descriptions and disclosure, the "carrier" refers to a sine wave at the transmit frequency unless otherwise indicated.

SUMMARY OF THE INVENTION

Herein disclosed is method for amplitude modulating a carrier so that digital data is transmitted at the same data rate as the transmit carrier frequency, one bit per cycle. For example, if the desired transmit frequency is 1.6 GHz, then the carrier is generated at 1.6 GHz, and the data rate carried on the carrier would be 1.6 gigabits per second. The data is synchronized by bit padding, adding error correction bits and buffering so that the data rate is the same as the transmit frequency. If the incoming data stream is at a low data rate, the data bits can be repeated a plurality of times and blocks of null bits can be added in order to increase the number of bits. Also, a large number of error correcting bits should be added in the padding process.

To accomplish encoding, the data and the carrier are synchronized at one bit per carrier cycle. The data is then used to turn an attenuating device, for example a transistor, on and off at the same point or points in each cycle of the transmit carrier, preferably as the carrier crosses its zero points.

If the actual transmission is to occur at 1600 MHz, for example, an incoming data stream of 500 mbps is padded with error correcting bits and extra bits to reach a final number of bits equal to the transmit carrier frequency, i.e., 1600 mbps. They are then buffered. The output of the buffer is synchronized to match the carrier frequency. The data signal with error correcting and padding bits is used to modulate the carrier. The data is used to switch a transistor on and off allowing the carrier wave to pass at full strength or attenuated. At one of the two zero points of each cycle, i.e., 0 degrees and 180 degrees, a transistor is switched on and off by the data bits to indicate the presence of a one or zero bit. The carrier is passed at full strength to represent, for example, a one, and at a reduced level, for example at 5% strength to represent a zero. Preferably, each full wave of the carrier is used to hold one bit of information. Since the carrier and data bits are synchronized, the frequency of the lower side band is zero. Any high frequency side band is filtered out and the carrier carries the information. The key to the invention is switching the transmit carrier strength in synchronous with the data signal, and switching attenuation on and off at or near the zero voltage crossing of the carrier sine wave.

Detection is a simple process of generating a phase locked sine wave locked to the received incoming signal, and then comparing the generated sine wave to the received signal. When the peak level of the incoming signal is less than a threshold, for example 20%, then the incoming signal represents, for example, a zero. Otherwise the incoming signal is a one. The detected bit stream is then error corrected using the encapsulated error correction bits to accurately recover the transmitted data.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
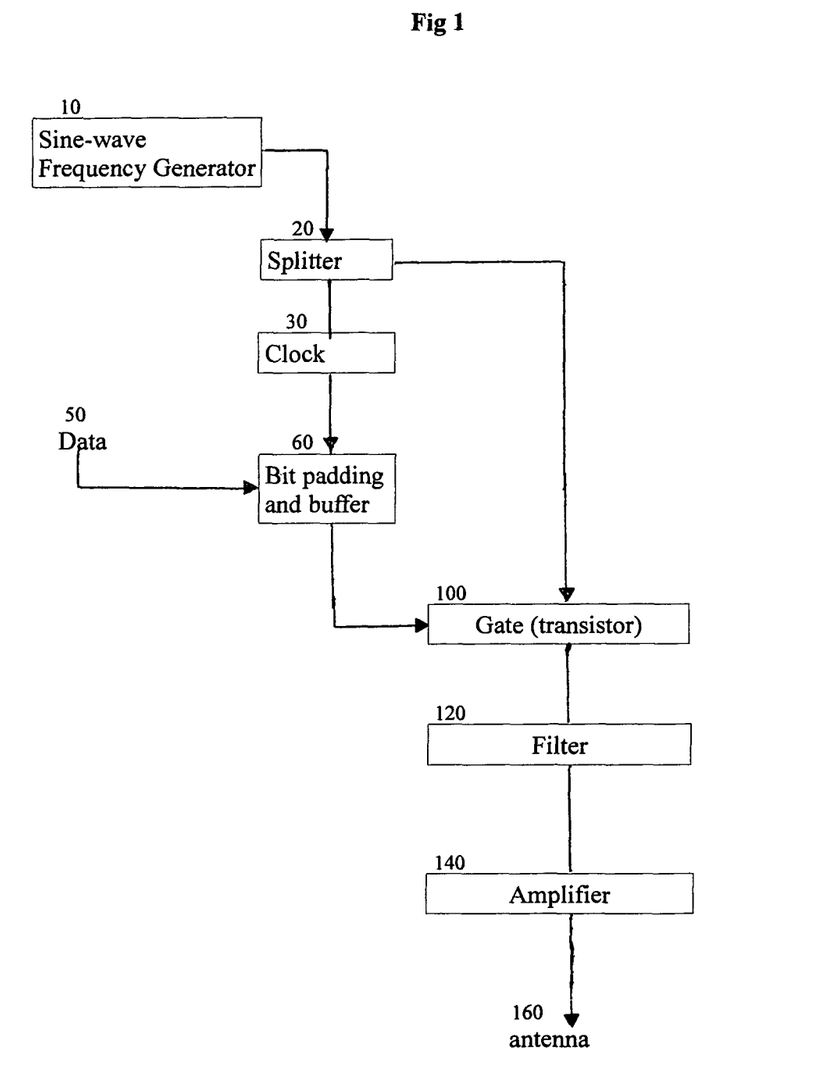
FIG. 1 exemplary illustrates a method of encoding data onto a carrier.

FIG. 1 illustrates a method of encoding data onto a transmit frequency carrier. The carrier is a sine wave on the transmit frequency. A frequency generator is used to create a sine wave to be used on the chosen transmit frequency 10. This signal is split into two paths by splitter 20. One of these two signals is shaped 30 so that it can be used as a clock to clock the buffer at one pulse per cycle. A data stream carrying the information to be transmitted 50 is fed into the a buffer 60. The buffer 60 adds any needed padding bits and error correction bits and times the release of bits to be transmitted with the clock, one bit per clock cycle. The buffer outputs a data signal at exactly the same data rate as the frequency of the clock. To make up the necessary number of bits to transmit the buffer might add block headers and endings. For example, a one GHz transmit carrier will require a one gigabits per second data rate. As an example, for a 350 mbps input data stream each bit can be repeated once resulting in 700 mbps. Each 4096 bits can be placed into a block with a 64 bit header and 1024 error correction bits. Blocks of all one bits can follow to make up the needed 1000 mbps.

The output of the buffer, which is now synchronous with the carrier is used to turn an attenuating transistor 100 on and off at the same point in each cycle of the carrier, such as when the carrier crosses the first zero point of each cycle.

The signal is then filtered 120 and amplified for transmission 140. In an alternative configuration where high power amplifiers are used, the output of the buffer can be used to directly increase and decrease the amplification of the sine wave. The transmit power of the amplifier can be directly driven by the output of the buffer 60. A sine wave carrier is passed through an amplifier where the gain of the amplifier is directly determined by the value of the data arriving from the buffer.

In the above examples, all harmonics are filtered off before transmission.

In an alternative embodiment, each first half cycle of the carrier is transmitted without attenuation, followed by one encoded half cycle where the signal is attenuated to represent for example a one bit and unattenuated to represent a zero bit. This allows the receiver to establish a level to compare the encoded portion of the signal against.

Other embodiments could use any combination from one to several unattenuated unencoded cycles followed by any desired number of encoded, i.e., on and off cycles. These full power cycles can be used to establish levels and marker bits.

Figure 2:
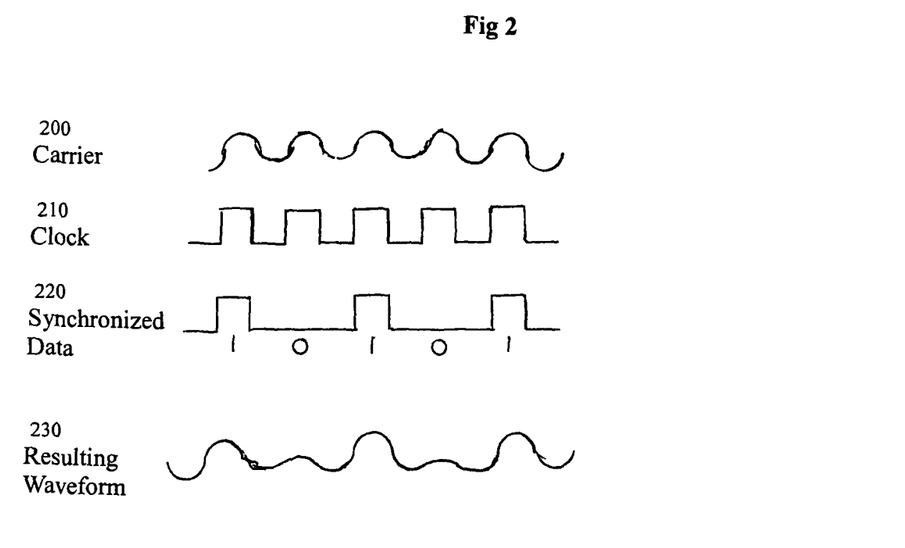
FIG. 2 exemplary illustrates the carrier, synchronized data and final modulated signal.

FIG. 2 illustrates the waveforms for FIG. 1. The carrier wave 200 is used to form a clocking signal at the same pulse rate as the transmit frequency. The carrier wave 200 is attenuated depending on the value of the synchronized data 220. If the data is to represent a one, the full strength signal is transmitted. If the signal is to carry a zero, then the carrier is switched off or heavily attenuated by, for example, 10 db. The resulting waveform 230 has the same frequency as the carrier but differing levels to represent data.

Figure 3:
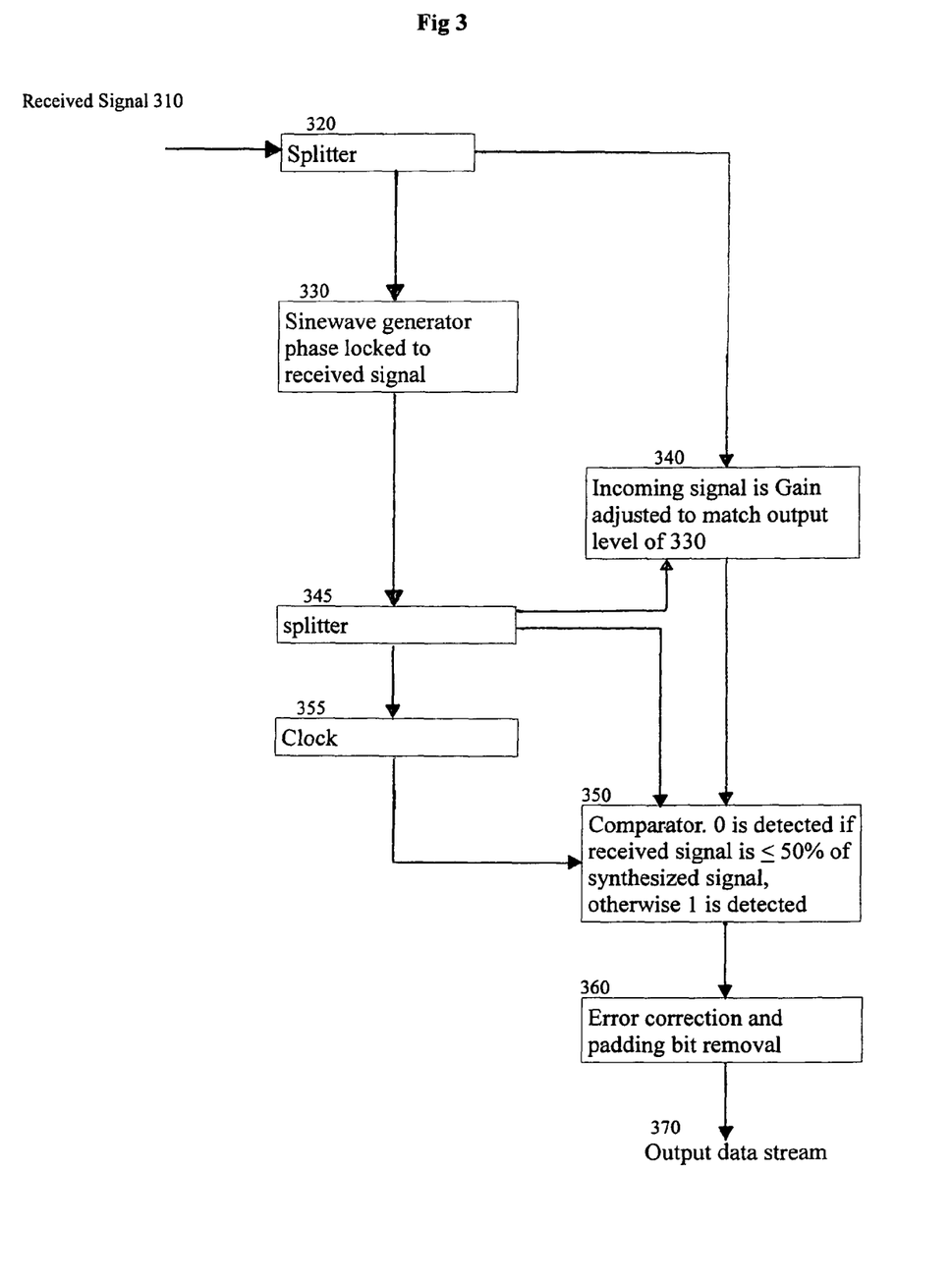
FIG. 3 exemplary illustrates a method of decoding the received encoded signal.

FIG. 3 illustrates a method of decoding the data at reception. The received signal 310 is split into two signals in splitter 320. One of these two outputs is feed into a frequency generator 330 that generates a phased locked sine wave (the synthesized signal) that exactly matches the frequency of the incoming signal 310. This generated sine wave is split 345 into multiple signals. One is used to clock the electronics, another is sent to a comparator 350. The comparator measures the peak level of the incoming signal to the synthesized signal. In this example, if the energy of the incoming signal is less than for example 20% of the synthesized signal a zero is detected, otherwise a one is detected. These detected bits are then fed into the error correction unit that removes any padding bits and fixes any errors 360, resulting in an output data stream 370.

Figure 4:
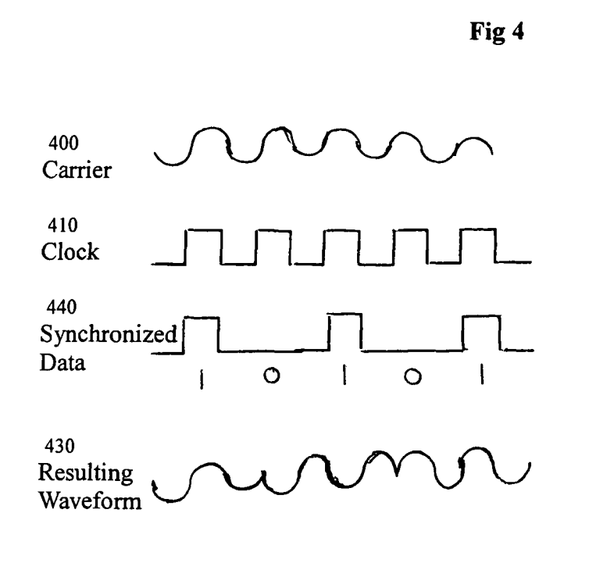
FIG. 4 exemplary illustrates the waveforms when transmitting data by changing the phase of the carrier 180 degrees to represent, for example, a zero bit, and to not change the phase to represent a one bit, such changes occurring only once or twice per cycle as needed.

FIG. 4 illustrates the waveforms resulting from another embodiment of this invention. Instead of attenuating the signal once every cycle of the carrier, a 180 degree phase change of the carrier is used to represent, for example a zero, and no phase change is used to represent the opposite binary, in this example one. The possible phase changes are synchronous with the frequency of the carrier 400, and in the preferred embodiment occur once per cycle. The data is padded to match the frequency of the carrier. For example, a 180 phase change could occur at every second crossing of the carrier through the zero point when zeros are being transmitted, and no phase change represents a one. The resulting waveform looks like 430.

In another embodiment, the phase changes can occur two times per cycle, 180 degrees apart as the carrier pass the zero point.

Figure 5:
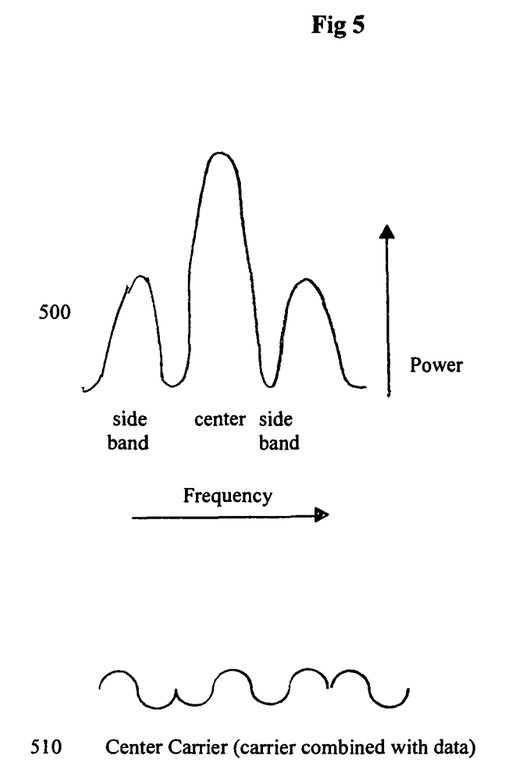
FIG. 5 exemplary illustrates the waveforms associated with transmitting data on an AM analog signal so that stereo radio and other data can be carried without detection by a standard mono audio AM receiver.

FIG. 5 illustrates the waveform when transmitting data within standard AM broadcast signals. This data can be used to carry stereo information inside the same signal used to transmit standard AM analog radio. Normally broadcast AM signals consist of a carrier wave with two AM sidebands 500. Most of the information is carried in the sidebands and the center carrier is unnecessary. In the preferred embodiment the center carrier is separated from the sidebands, then the encoded information is added to the center carrier using the 180 degree phase changes as described above for FIG. 4, and then reinsert the modified carrier 510 with the previously removed sidebands. The resulting AM signal looks similar to the 500 in frequency but contains digital information in the center bands. The data encoded in the center carrier 510 could contain digitized left and right stereo signals along with optional extra data. For example, a 1040 kHz signal could be used to encode 1.040 mbps information in the main carrier at one bit per cycle with the analog signal occupying the sidebands. The modulation index of the carrier should preferably be below 0.5. The data stream carried in the main carrier could contain two each 256 kbps audio channels, a third data channel of 256 kbps and the rest as control and error correction bits. A standard AM receiver would receive the AM signal and decode it as it normally would. Special receivers would ignore the sidebands and just decode the data in the center channel by detecting the phase changes in the carrier. The decoded data would then be converted into analog left and right channel audio signals.

Figure 6:
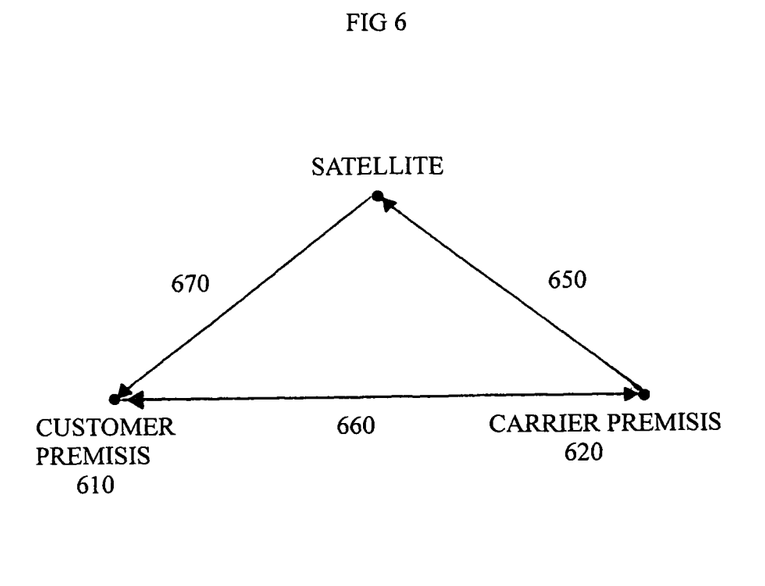
FIG. 6 exemplary illustrates a method of transmitting large data files in support of low speed, typically under 2 mbps, telephone line based Internet traffic.

Currently telephone companies are not capable of sending or receiving data much above two megabits on their twisted pair phone lines. The method disclosed above allows for large amounts of data to be transmitted on a single narrow band signal, using very little bandwidth. By putting multiple AM carriers on a satellite or ground based radio, a greatly increased capacity can now be provided in a small amount of bandwidth. FIG. 6 shows a configuration where satellite is used to supplement two way telephone line based Internet traffic.

Phone companies have slow data speeds on twisted pair wires. Since large files take a lot of capacity, but requests for those files take little capacity, traffic is asymmetrical. Far more capacity is needed for downloads than uploads. For example, a request for a movie might occupy 20 kilobits. The downloaded movie might occupy 10 gigabytes. By augmenting a twisted pair Internet link with a one high speed way link from the carrier's premises to the customer's premises using, for example, a satellite, it would be possible to quickly download large files over the satellite when a request for a large file is received.

Once a client 610 requests a large file, the server decides, depending on the file size, whether to fulfill the request using the twisted pair line 660 or via the radio frequency high capacity link 650. This radio frequency link could be a ground based radio link or in this example a satellite link 650. The server either fulfills the request by downloading the file on the twisted pair Internet connection 660, or tells the client to look at the satellite downlink 660 to find the file. Multiple large files from multiple users are aggregated by the server at the carrier premises 620 and sent up to the satellite on a one way link to the client. Once receiving instructions from the server, the clients computer looks at the satellite downlink 670 for the file. Upon reception of the large file the clients computer notifies the phone companies server of receipt of the file. The client has two way capacity on the twisted pair 660, but only downlink capacity from the satellite 670. The satellite is only used to augment the twisted pair connection by transmitting large data files as needed. The phone company aggregates the large files together into one or a few number of high capacity data streams which are modulated then sent from the server to the satellite and subsequently to the client. Each transmitted radio frequency carrier contains a plurality of accumulated large files for a plurality of the phone company's customers.

The advantage of high capacity in a narrow band signal is that it dramatically increases capacity on any radio channel using it, thus providing faster and lower cost data transfers. The advantage of augmenting the phone companies twisted pair service with, for example, a 2 gbps satellite downlink is that the client receives a giga-bps service from the phone company through a twisted pair with satellite augmentation.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of communicating data on a single fixed frequency carrier, comprising:
   providing a radio frequency link on a communication network for communicating said data from a server;
   generating a sine wave on a same frequency as to be transmitted, said sine wave being the single fixed frequency carrier;
   synchronizing an input data stream with the carrier so that the number of bits in the data stream equals the frequency in cycles per second of the carrier;
   adding extra bits to said input data stream in case said number of said bits in said input data stream is not equal to said frequency in cycles per second of said carrier so that bit rate of said input data stream always matches said frequency in cycles per second of said carrier;
   using said synchronized input data stream to attenuate the carrier so that one binary state is represented by a full strength carrier signal and the second binary state is represented by an attenuated carrier signal; and
   switching said attenuation synchronously with the cycling of said carrier so that one bit is encoded per one cycle of a transmitted signal;
   whereby digital information is transmitted on a sine wave carrier.

2. The method of claim 1, wherein the attenuation is changed at the zero voltage crossing point.

3. The method of claim 1, wherein the carrier is used to clock and synchronize the data bits.

4. The method of claim 1, wherein one data state is represented by over 50% attenuation of the carrier.

5. The method of claim 1, wherein padding bits and error correction bits are added to the data stream to match the carrier frequency.

6. The method of claim 1, wherein at reception of the incoming signal a comparison is done to determine if received signal strength is at a maximum or under some percentage of the maximum strength, and using the result to determine value of the encoded binary state.

7. The method of claim 1, wherein the switching of attenuation in order to encode data occurs on every second half cycle with the other half cycle being transmitted at full strength whereby one bit is encoded per one cycle of the transmitted signal.

8. The method of claim 1, further including:
   sending one or more full power cycles not encoded with data followed by one or more cycles with encoded data; and
   matching the data rate of the input data stream to the actual encoded and transmitted data.

9. The method of claim 1, wherein multiple carriers are amplified in a common amplifier for transmission.

10. A method of communicating data on a single fixed frequency carrier, comprising:
    providing a radio frequency link on a communication network for communicating said data from a server;
    generating a sine wave on a same frequency as to be transmitted, said sine wave being the single fixed frequency carrier;
    synchronizing an input data stream with the carrier so that the number of bits in the data stream equals the frequency in cycles per second of the carrier;
    adding extra bits to said input data stream in case said number of said bits in said input data stream is not equal to said frequency in cycles per second of said carrier so that bit rate of said input data stream always matches said frequency in cycles per second of said carrier; and
    using said synchronized input data stream to change the phase of the carrier by 180 degrees to represent one of a binary one and binary zero, and not changing the phase to represent the other binary state, and whenever the phase is changed, performing the phase change at same relative phase angles of each carrier cycle, at a zero crossing point and only once per carrier cycle;
    whereby digital information is transmitted on a sine wave carrier.

11. The method of claim 10, further including the use of AM sidebands to carry analog or digitally encoded analog radio information.

* * * * *